United States Patent [19]
Jones et al.

[11] Patent Number: 4,773,695
[45] Date of Patent: Sep. 27, 1988

[54] WINDSHIELD ATTACHMENT FOR A GOLF CART OR THE LIKE AND A METHOD FOR INSTALLING

[75] Inventors: Jack D. Jones, Lima, Ohio; Russell K. Glover, Jr., Tequesta, Fla.

[73] Assignee: Aircraft Dynamics Corporation, Elida, Ohio

[21] Appl. No.: 88,117

[22] Filed: Aug. 21, 1987

[51] Int. Cl.$^4$ .............................................. B60J 1/06
[52] U.S. Cl. ................................ 296/77.1; 296/96.21; 280/DIG. 5
[58] Field of Search ................ 296/78 R, 84 A, 84 N; 280/DIG. 5; 248/225.1; 29/469

[56] References Cited

U.S. PATENT DOCUMENTS

| | | | |
|---|---|---|---|
| 3,829,152 | 8/1974 | Hobbs | 296/78 R |
| 4,488,750 | 12/1984 | Gerber | 296/78 R |
| 4,621,859 | 11/1986 | Spicher | 296/78 R |
| 4,652,037 | 3/1987 | Thau et al. | 296/78 R |

*Primary Examiner*—Robert R. Song
*Attorney, Agent, or Firm*—Sidney W. Millard

[57] ABSTRACT

A windshield attachment for a golf cart or the like comprising an upper panel hinged to a lower panel at a horizontal hinge for movement from upright closed position to a lower dependent open position. The lower panel is provided with vertically spaced crossbars of tubular type with slotted ends. Clamping units fit over the posts and extend into the crossbar slots in interlocking relationship with the bars to hold them in selected horizontal positions at the respective levels. A similar top crossbar is similarly mounted on the posts at an upper level to engage the edge of the top panel when closed.

13 Claims, 4 Drawing Sheets

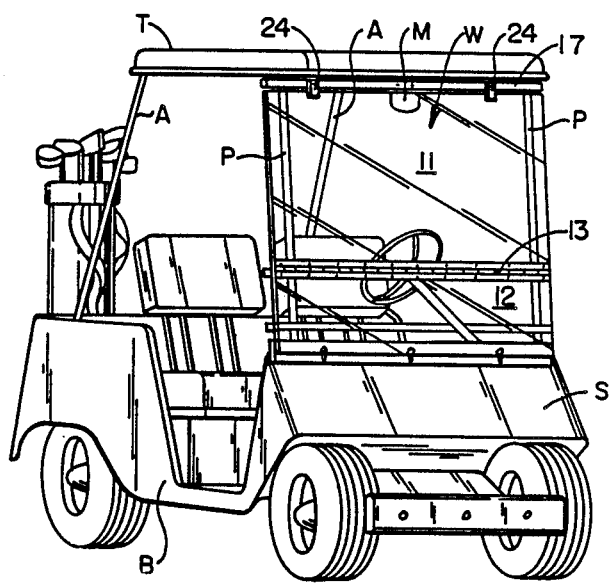
FIG. 1
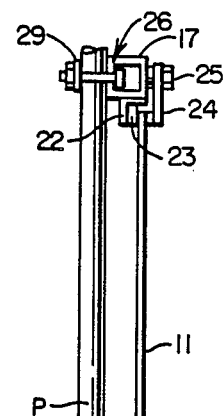
FIG. 3
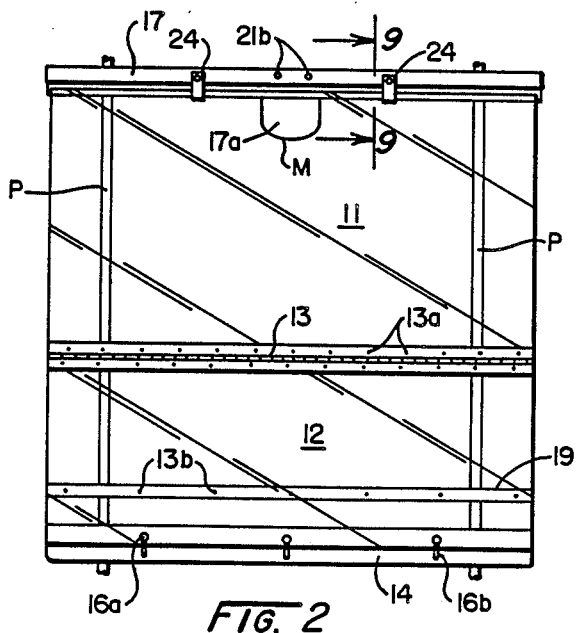
FIG. 2
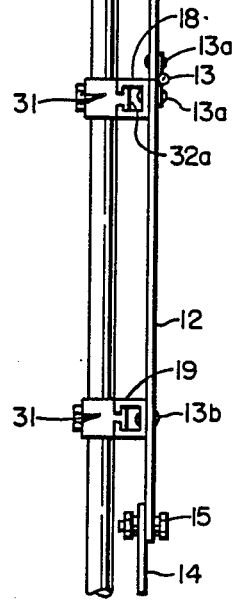

4,773,695

WINDSHIELD ATTACHMENT FOR A GOLF CART OR THE LIKE AND A METHOD FOR INSTALLING

FIELD OF THE INVENTION

This invention relates to a windshield attachment for a golf cart or similar vehicle.

BACKGROUND OF THE INVENTION

Most golf carts manufactured today have a conventional top supported by posts with the front completely open so that there is no protection for the driver and passenger from inclement weather when it occurs. Attempts have been made to provide a protective windshield attachment for such vehicles but due to variation in vertical height and lateral spacing of the front support posts and the variations in the posts themselves of various makes of carts, these attempts have not resulted in a simple attachment which will fit the various makes of carts. Also, these prior art attachments are usually complicated and difficult to install on a cart in a satisfactory manner.

BRIEF DESCRIPTION OF THE INVENTION

The present invention provides a windshield attachment which can easily be mounted on the laterally-spaced front support posts of a golf cart or the like. It consists of a lower fixed transparent section and an upper transparent section which is hinged thereto for vertical swinging movement. When the upper section is swung to its closed position, it will serve along with the lower section as a protective windshield to shield the driver and passenger from inclement weather and/or cold wind in the early spring or late fall. When swung to its lower position it will serve to deflect cooling air upward and rearward over the driver and passenger as the cart is driven.

The attachment has mounting means of such a nature that it can be mounted readily to the front roof support posts of various makes of carts even though there are variations in the lateral spacing of the posts. Also, it will fit on various posts even though there is some variation in the heights of such posts. The attachment is installed in a unique way by first installing clamps on the vertically extending posts and then inserting the one end of the intermediate and the lower crossbars into the "T" slot sections of the clamps on one post. Next, these two crossbars are shifted all the way to one side of the cart until the other ends of said crossbars are exposed to receive the "T" sections of the clamps on the other post through their said other ends. Then, with the clamps on both posts engaged within the hollow crossbars, the windshield is centered with respect to the two vertical posts and the clamps are tightened on the posts to lock the windshield and post in operative position.

Objects of the invention which are not clear from the above summary will be obvious from the accompanying drawing and the description of the preferred embodiment which follows.

BRIEF DESCRIPTION OF THE DRAWINGS

The best mode contemplated in carrying out this invention is illustrated in the accompanying drawings in which:

FIG. 1 is a perspective view of a golf cart having the windshield attachment of this invention mounted thereto, showing the windshield in closed position;

FIG. 2 is a front elevational view of the windshield attachament;

FIG. 3 is an enlarged side elevational view of the windshield attachment;

DETAILED DESCRIPTION OF THE INVENTION

Figure 10:
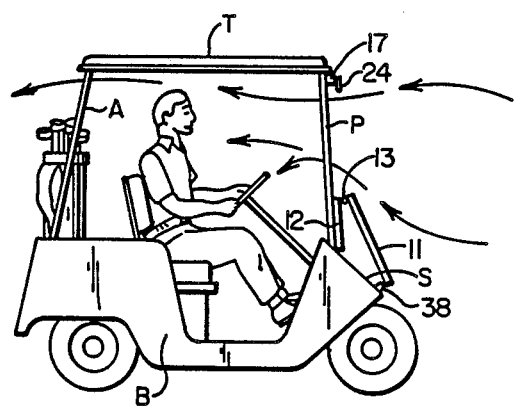
FIG. 10 is a schematic side elevational view of the cart showing the windshield in open position.

With reference to the drawings, FIGS. 1 and 10 illustrate a vehicle in the form of a golf cart to which the windshield attachment of this invention has been mounted. The cart is shown as comprising a wheeled body B with a downwardly inclined skirt S at the front end thereof. Extending upwardly from this skirt are the laterally-spaced posts P which may be inclined slightly rearward and which along with rear posts A, which are angled forward, support a slightly inclined roof T.

The windshield attachment of this invention is illustrated generally at W and in structural detail in FIGS. 2 to 6. Suitably supported at the front edge of the top T is a dependent rear view mirror M. The windshield assembly itself consists mainly of an upper rectangular panel section 11 and a lower, smaller rectangular panel section 12 hinged together at their meeting horizontal edges by a piano-type hinge 13 which is suitably fastened to the respective panels by rivets 13a. The panels are preferably of plexi-glass but may be of other suitable transparent plastic, such as polycarbonate, or perhaps tempered glass. A trim strip 14 of aluminum or the same material as panels 11 and 12 may be connected for vertical adjustment to the lower edge of the lower panel 12. If the strip is used, the connection consists of clamping bolt and nut units 15 which are extended through laterally-spaced openings 16a at the lower edge of panel 12 that align with laterally-spaced vertical slots 16 in the strip. The units 15 may be released to permit vertical adjustment of the trim strip 14 relative to the panel section 12 and then tightened to clamp the strip in vertically adjusted position. The purpose of strip 14 is to seal against the sloping surface S to prevent water, dust or the like from blowing on the passengers when the panel 11 is in up position to shield the occupants.

Thus, the windshield unit consists mainly of the lower panel section 12 and the upper panel section 11 hinged together at their meeting edges by the pivot hinge 13. To properly mount this unit on the posts P, three crossbars are provided consisting of an upper crossbar 17, an intermediate crossbar 18, and a lower crossbar 19, the latter two being of identical form. These bars are preferably of extruded aluminum.

Figure 4:
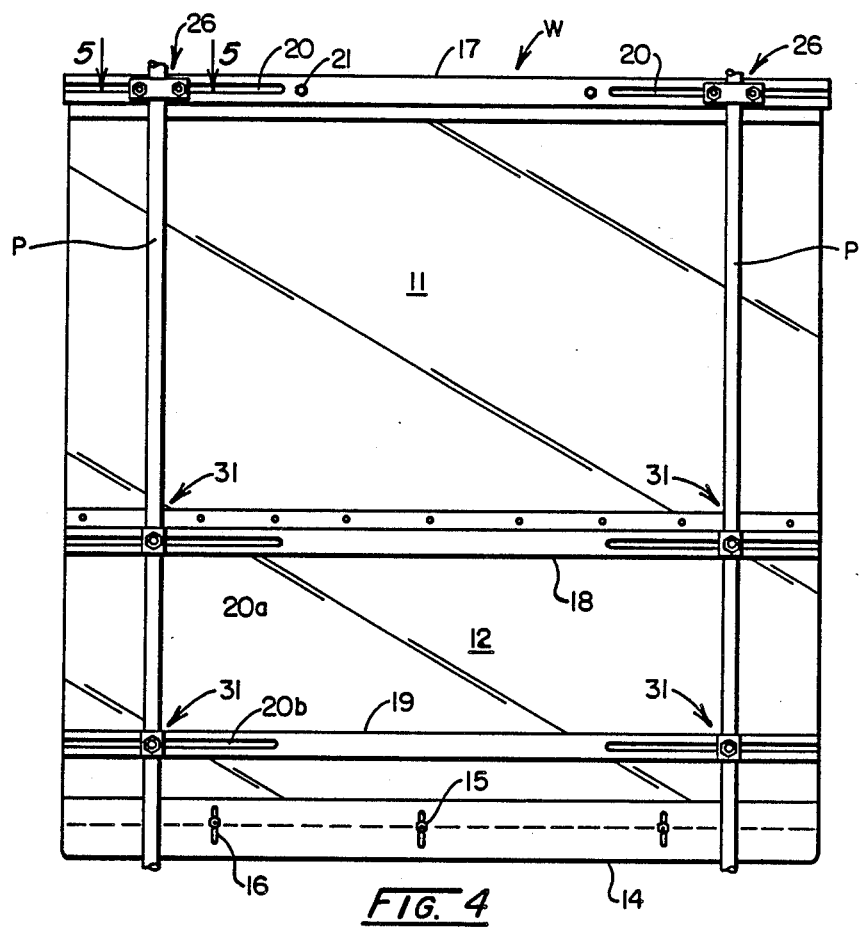
FIG. 4 is an enlarged rear or inner view of the windshield attachment.

The top crossbar 17 which is slightly longer than panel 11 is of square tubular form and at each end, one of its walls is provided with a slot 20 which is open at its outer end and extends inwardly substantially to a bolt hole 21 best seen in FIG. 4.

A pair of bolt holes 21a is provided at midpoint of the bar 16 to receive bolts 21b for clamping in place a mirror mounting bracket or plate 17a in depending position, best seen in FIG. 2.

Each of the crossbars 18 and 19 is of similar square tubular cross section and has the outwardly-opening slots 20a or 20b formed in their respective ends. The separate top crossbar 17 has an angle iron 22 fastened to its lower surface (FIG. 3) to provide a depending flange that carries on its front surface a weather strip 23 of suitable yieldably compressible material. The crossbar 17 also carries a pair of laterally-spaced latches 24 which are pivoted to the front surface thereof by the pivot bolts 25 passed through openings 21 and are normally in a dependent position.

Figure 9:
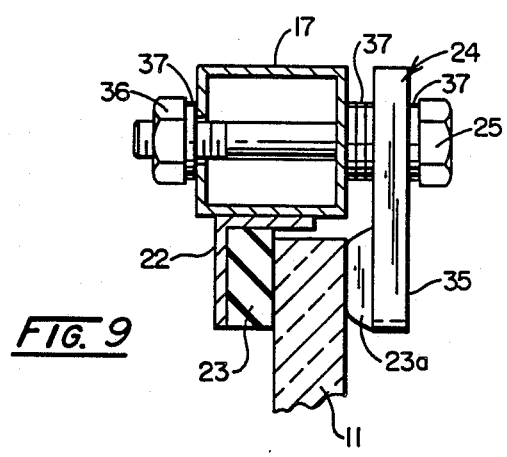
FIG. 9 is a vertical sectional view through one of the latches taken on line 9—9 of FIG. 2.

The details of one of the latches 24 are shown in FIG. 9. The latch itself as shown is a depending member 35 pivotally carried by the clamping bolt 25 at the front side of top crossbar 17. The bolt is extended through the bar 17 and has a lock nut 36 on its threaded inner or rear end with an associated nylon washer 37. Between the front side of bar 17 and member 35 and between that member and the head of bolt 25 are nylon washers 37. The outer end of latch member 35 carries on its inner surface a button 23a adapted to yieldingly engage the front surface of transparent panel 11.

The intermediate crossbar 18 is suitably fastened in a horizontal position by bolts or rivets 13a to the panel 12 just below the hinge joint 13.

Similarly, the lower crossbar 19 is fastened at 13b to that panel at a horizontal position just above its lower edge. Thus, the crossbars 18 and 19 are fixed to the panel 12 and will be later mounted on the posts P but the crossbar 17 is not attached to panel 12 and is adapted to be mounted separately on the posts. Crossbars 18 and 19 are of equal length to the panels.

Figure 5:
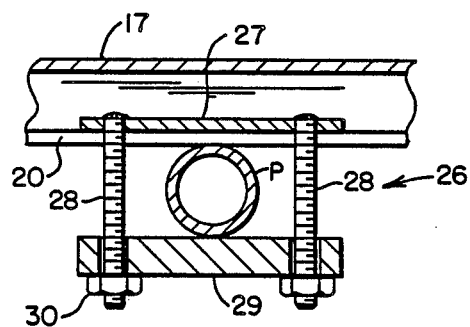
FIG. 5 is an enlarged fragmentary sectional view taken on line 5—5 in FIG. 4 of one of the clamps for locking the upper windshield support crossbar to the posts.

For mounting the top crossbar 17 on the posts P, a pair of clamp units 26 of the type shown in detail in FIG. 5 may be used. Each clamp unit comprises an inner anchor bar 27 which may be of steel and is adapted to be disposed within the tubular crossbar 17 and which has a pair of bolts 28 tack-welded thereto. These bolts are adapted to extend outward and rearward through the slot 20 at the rear side of the crossbar. Bolts 28 are spaced apart substantially more than the post diameter for reasons which will be explained subsequently. Fitted loosely on the outer ends of these bolts 28 is a clamping bar 29, preferably of aluminum, which is held on the bolts by outer clamping nuts 30.

To position a clamp unit 26 on a post P, which may be round or square, the bar 29 is removed, the bar 27 is slipped into the open end of the crossbar 17 with the bolts 28 slipping through the open end of the slot 20. Then the spaced bolts 28 are positioned over the posts P, the bar 29 is positioned on the bolts and the clamping nuts 30 are applied to the bolts. Spacing of the bolts permits application to a post which may have some lateral curvature.

Figure 6:
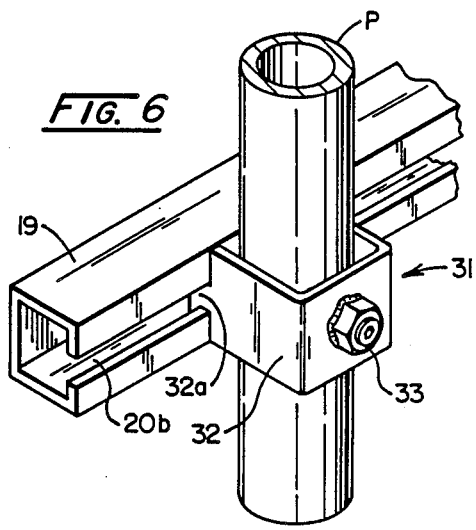
FIG. 6 is an enlarged perspective view of one of the U-shaped post clamps for locking the intermediate and lower windshield crossbars to the posts.

For attaching the other two crossbars 18 and 19 to the respective posts P, a pair of clamping units 31 of the type shown in FIG. 6 is provided for each bar. Each of the units 31 is formed of a metal strap bent into a U-form member 32 which has a T-shaped tab 32a on its inner end (See FIG. 3). Each U-shaped member 32 may straddle a post P, which may be round, square, or rectangular, and then the T-tabs 32a may be slipped into the outer open end of the slot 20a of crossbar 18 or the slot 20b of crossbar 19 shown in FIG. 6. The outer side of the U-member 32 has a nut 33 welded or brazed thereto. Projecting through a threaded hole in nut 33 is an externally threaded bolt having an Allen wrench slot in its head to allow said bolt to be tightened into locking frictional engagement with post P.

Figure 7:
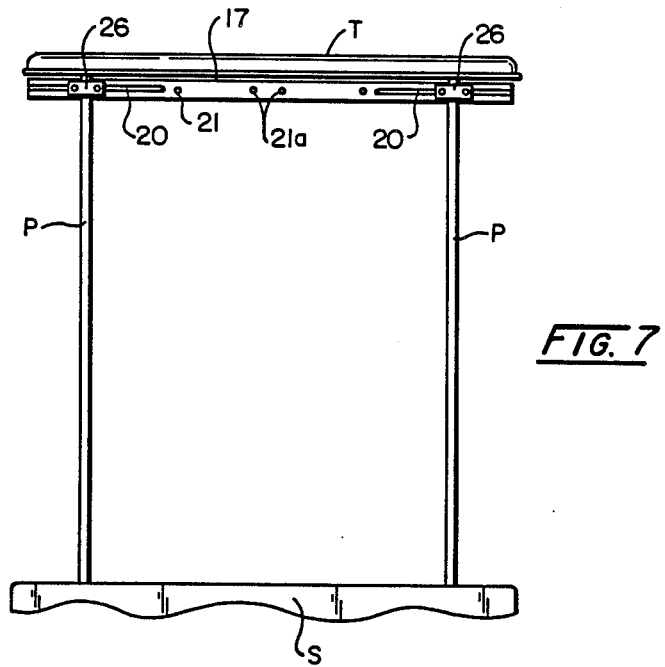
FIG. 7 is a schematic view showing the upper crossbar support positioned on the posts.
Figure 8:
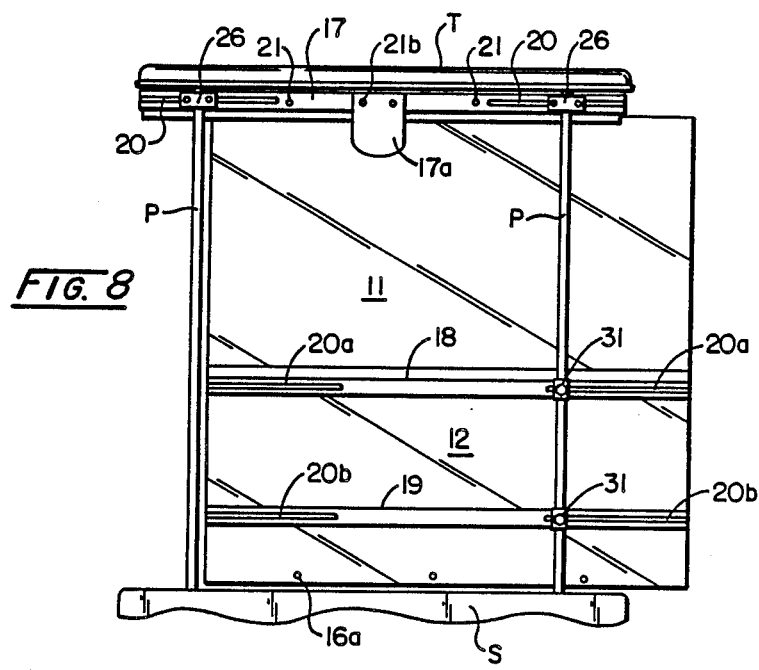
FIG. 8 is a schematic view illustrating the initial step in mounting the windshield on the posts and upper crossbar.

The windshield attachment as described comprises the upper panel 11 and lower panel 12 hinged together at the piano hinge 13. It will also include the lower crossbar 19 and the intermediate crossbar 18 adjacent the hinge 13 both of which are fixed to the panel 12. The top bar 17 is separate. To mount this windshield assembly the steps indicated in FIGS. 7 and 8 are followed. First, the top crossbar 17 is installed. This is done by mounting the clamp units 26 loosely on the posts P with the clamps loosely positioned through the outer ends of the respective slots 20 to slidingly interfit with the tubular crossbar. The bar 17 may be moved to its top position directly under the top T and moved laterally to center it relative to the posts P, and then the clamps 26 may be tightened to hold it in that position as shown in FIG. 7.

Next, the windshield itself is installed as indicated in FIG. 8. To do this, the clamps 31 are fitted loosely around the right hand post P. Then by moving the windshield to the right, those clamps are passed through the open ends of the respective slots 20a and 20b of the middle and lower crossbars 18 and 19. The hinged panels 11 and 12 are slipped to the right to such an extent that the left hand edge of these panels clears the left hand post as shown in FIG. 8. At this time the right hand clamps 31 remain loosely interfitted with the tubular crossbars 18 and 19. The clamps 31 are now loosely positioned on the left hand post P. These clamps are then passed through the open left hand outer ends of the slots 20a and 20b of the respective tubular crossbars 18 and 19 in loose sliding interfitting engagement therewith. The windshield panels 11 and 12 are next centered by sliding the unit to the left and the unit is pushed upward until there is a slight clearance between it and the top crossbar 17 at which time all the clamps 31 are tightened by Allen wrenches to interlock with the respective crossbars to hold the unit in place, the final position being shown in FIG. 4. It is intended that plastic ends be affixed by each open end of crossbars 17, 18, and 19 to prevent injury to individuals who might inadvertently bump into the crossbars or stick a finger into the open end thereof. Such plastic end pieces may be inserted into the ends or over the ends as desired. They are not illustrated in the drawings because various shapes may be satisfactory.

If the lower edge of lower panel 12 is sufficiently close to the skirt S, the trim strip 14 need not be used as indicated in FIG. 8. However, if needed it may be fastened in proper vertical position as indicated in FIGS. 2 and 4.

When closed, the upper edge of the upper panel 11 engages with the weather strip 23. It is held in sealing engagement with that strip by swinging the latch member 24 downward so that buttons 23a engage the front surface of panel 11 and hold it in sealing engagement with the front surface of panel 11.

Thus, the upper panel 11, when in closed position, will serve to protect the driver and passenger from wind and rain or other inclement weather. However, during good weather, the latch members 35 may be swung upward and then the panel 11 may be opened by swinging it downward about hinge 13 to the lower position shown in FIG. 10 in engagement with bumpers 38 of compressible material located on skirt S. At this time the panel 12 will be in a rearward upwardly tilted position. In this position, as the cart moves, that panel will serve to deflect air upward and rearward over the driver and passenger as indicated by the arrows in FIG. 10. Also, air will flow directly under the top T as indicated.

It will be apparent from the drawings and the above description that this invention provides a simple yet effective windshield attachment for golf carts or other similar vehicles having the conventional top supported by laterally spaced posts. The windshield will serve the dual function of deflecting rain and cold wind from the driver and passenger when upright and closed, and of deflecting air upward and rearward over the driver and passenger when folded down. The windshield can be attached easily to various makes of carts, even though there are variations in the shape or lateral spacing of the front top support posts and limited variations in the height of such posts.

Having thus described the invention in its preferred embodiment, it will be obvious that certain modifications may be made in the invention without departing from the spirit of the invention. Accordingly, it is not intended that the language used to describe the preferred embodiment be limiting on the invention. Rather, it is intended that the invention be limited only by the scope of the appended claims.

I claim:

1. A windshield attachment for a vehicle having laterally spaced, vertically extending top support posts at its forward side, said attachment comprising:
    an upper panel hinged to a lower panel at a horizontal hinge for vertical swinging relative thereto;
    a lower crossbar fastened to the lower panel at a lower horizontal position and an intermediate crossbar fastened to the lower panel at an upper horizontal position adjacent the hinge, and clamps for clamping the respective bars to the posts;
    said bars being of tubular form and each bar having open ends and an inwardly opening slot at each end;
    said clamps engaging the posts and having innerlocking portions which extend through the respective crossbar slots and into interlocking engagement with the tubular crossbars to hold them in selected horizontal positions on the posts.

2. A windshield attachment according to claim 1 including an additional top crossbar of tubular form with open ends and an inwardly opening slot at each end, and clamps for clamping the bar to the posts; said clamps engaging the posts and having inner locking portions which extend through the respective crossbar slots and into interlocking engagement with the tubular crossbar to hold it in a horizontal position on the posts at the upper edge of the upper panel.

3. An attachment according to claim 1 in which the crossbars are of square tubular form, the slots are in one side wall of the bar and the inner locking portion of each clamp is of T-form.

4. An attachment according to claim 3 in which each clamp is of U-form and straddles the posts, and the U-extremities are T-lugs, and the clamp carries a clamping bolt adjustable into engagement with the post.

5. An attachment according to claim 2 in which the top crossbar is of square tubular form with the slots in one side wall of the tube, and each of the clamps comprises an inner anchor bar in the tube inwardly of the slot, said anchor bar carrying spaced bolts extending outwardly through the slot, a clamping bar positioned on the bolts outwardly of the bar side wall, and clamping nuts carried by the bolts.

6. An attachment according to claim 2 in which the top bar has a depending flange to engage the upper panel adjacent its upper edge, and latches carried by the top bar for engaging the panel and holding it against the flange.

7. An attachment according to claim 6 in which the flange carries a weather strip.

8. An attachment according to claim 6 including a rear view mirror mount plate secured to the top crossbar in dependent position.

9. An attachment according to claim 7 in which the latches are members pivoted to the bar and carry yieldable buttons to engage the panel and press it against the weatherstrip.

10. An attachment according to claim 2 in which the support posts extend upwardly from an upwardly and rearwardly inclined skirt and the upper panel swings downwardly with its end in association with the skirt.

11. An attachment according to claim 10 in which the lower panel has a trim strip mounted for vertical adjustment at its lower edge.

12. A method of installing a windshield unit on laterally spaced top support posts of a vehicle, the windshield consisting of a unit comprising an upper panel hinged to a lower panel at a horizontal hinge, the lower panel having an upper crossbar fixed thereto at the hinge and a lower crossbar fixed thereto, the bars being of tubular form with open ends and outwardly opening exposed slots at the end, the steps comprising:
    providing clamps for the upper and lower crossbars of the lower panel and loosely applying said clamps on one of the posts at a selected side, slipping the unit laterally toward that side to cause a part of each clamp to enter the adjacent end of one of the bars through the slots into interlocking engagement therewith,
    moving the unit further in the same direction until the clamps reach the ends of the slots,
    applying other clamps loosely on the post at that opposite side and then reversing the lateral movement of the unit to cause a portion of the other clamps on that opposite side post to enter the ends of the crossbar and into the slots at such ends,
    continuing the reversing lateral movement until the unit is centered on the posts, and
    tightening all the clamps to hold the bars in fixed horizontal positions on the posts.

13. The method of installing of claim 12 including providing a top crossbar having open ends and slots extending from each end,
    sliding a part of a clamping unit into each end of the top crossbar with another part of each clamping unit extending through the adjacent slot,
    attaching the top crossbar to the posts by engaging the parts of the clamping units extending from the slots.

* * * * *